Sept. 19, 1939.  L. B. HEADRICK  2,173,165
ELECTRON TUBE
Filed May 16, 1936
*Fig. 1*
*Fig. 2*
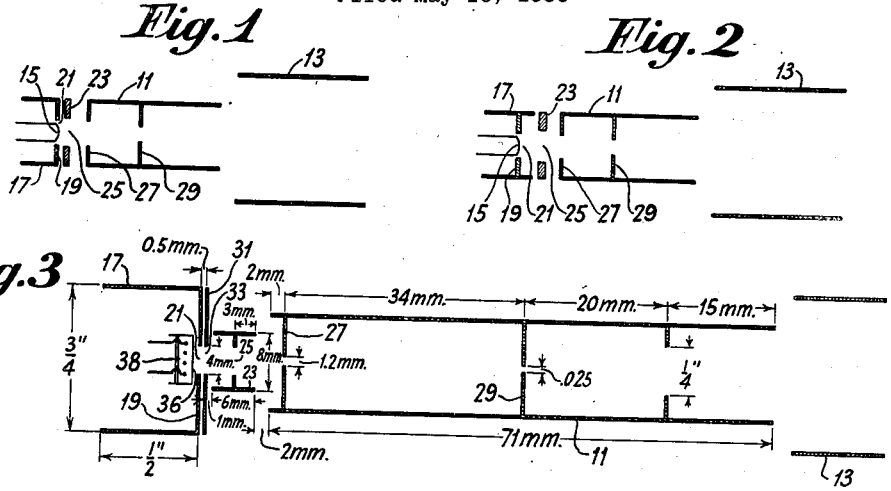
*Fig. 3*
*Fig. 4*
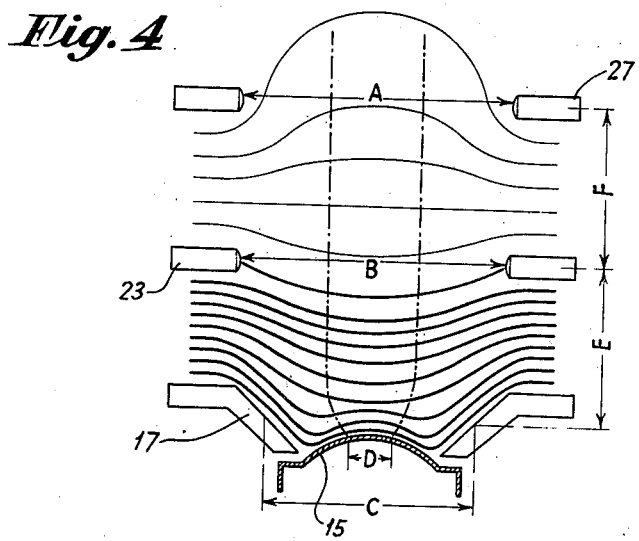
*Fig. 5*
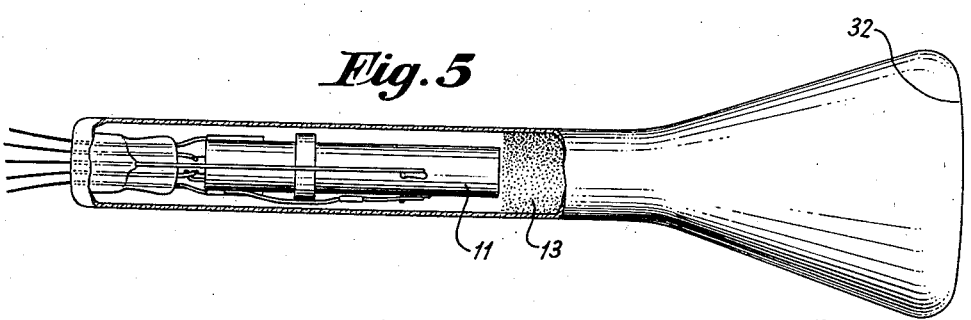
INVENTOR
LEWIS BARNARD HEADRICK
BY *H. S. Grover*
ATTORNEY Patented Sept. 19, 1939

2,173,165

UNITED STATES PATENT OFFICE 2,173,165

ELECTRON TUBE

Lewis Barnard Headrick, West Orange, N. J., assignor to Radio Corporation of America, a corporation of Delaware Application May 16, 1936, Serial No. 80,061

5 Claims. (Cl. 250—162)

This invention relates to electron tubes, and principally to tubes particularly of the cathode ray, X-ray, beam, oscillator or similar types. The invention is particularly concerned with an electrode arrangement for the above type tubes and is for the purpose of providing for sharp focussing of the luminescent spot produced by the impact of the electron beam developed within the cathode ray tube upon a luminescent screen structure suitably supported upon one of the walls (for example, an interior end wall) of such a tube surface.

In cathode ray tubes of the type ordinarily used in practice, an electron beam, pencil or ray (hereinafter referred to as a "beam") is developed by applying a suitable voltage between an anode and a cathode (usually a heated electrode) from which latter source electrons are emitted. This developed electron beam is then projected longitudinally along the tube to impinge upon the luminescent screen structure. In cathode ray tubes this electron impact serves to produce a spot of light at the point of impact. The intensity of the light spot developed by the beam impact is usually controlled by placing in the path of the developed beam a control electrode. This control electrode, herein called a "grid" although shaped as an apertured disk, is usually placed a short distance above the cathode surface and intermediate the cathode and anode. Such control or grid electrode has, in the past, usually been operated at a negative potential with respect to cathode potential.

In operating electron tubes of the cathode ray type, the cathode element from which the electrons forming the electron beam are developed is usually a flat or concave surface. The curvature of the electron accelerating field above the cathode surface and toward the anode and screen is such that the developed electron beam passes through a first focal region a short distance from the cathode surface and must later be focussed on the screen. Experiments have shown that the space charge in the focal region above the cathode and aberration in the focussing field above the cathode are the main features in determining the minimum spot diameter which can be obtained with an electron gun of the type above described even though the resulting electrons are suitably focussed to a sharply defined point upon the luminescent screen structure whereat the light is developed by the impact of the beam thereon.

Several advantages in focussing the electron beam on the luminescent screen can be had by eliminating the first focal region, above described, above the cathod surface. This can be accomplished by producing, in the manner above outlined, an electron beam which is essentially parallel or slightly divergent between the cathode surface and the final focussing field, the latter field being developed, preferably, between the first and the second anodes of the tube so as to form the cathode ray spot on the screen structure.

The mere production of an essentially parallel beam of electrons is of itself not a particularly difficult problem, but many difficulties are encountered in providing suitable control for such a beam. Any control of beam intensity must be such a control as will not change the direction of the uncontrolled electron beam toward the screen.

It is an object of the present invention, therefore, to provide an electron tube and electrode arrangement therein whereby an essentially parallel beam of electrons is developed within a cathode ray tube prior to the final focussing of the electron stream upon the luminescent screen. At the same time, it is an object of this invention to provide suitable ways and means by which a parallel electron beam of electrons can be efficiently controlled so as to provide for variations in the intensity of the light spot resulting from impact of the beam upon the luminescent screen structure.

Other objects of the invention are those of providing with a produced essentially parallel electron beam a control electrode system which will give a good and sufficient control action and still intercept only a very small percentage of the total beam current.

A further object of the invention is to provide ways and means for controlling an essentially parallel beam of electrons which control, when operating, will not change the direction of motion of the electrons forming the electron beam. A further object of the invention is to provide ways and means for controlling an essentially parallel beam of electrons which will produce a minimum change in the focussing field between the electrode controlling the electron beam and the first accelerating anode of the tube.

Other objects and advantages of this invention will, of course, become apparent and suggest themselves to those skilled in the art by reading the following specification and description of the operation of the invention as exemplified by the accompanying drawing, wherein Fig. 1 illustrates schematically, without an enclosing envelope, the general form of electrode arrangement within a tube of the cathode ray type herein to be described;

Fig. 2 illustrates, also schematically, and also without the use of an enclosing envelope, a slightly modified form of electrode structure for a cathode ray tube of the type to be herein described;

Fig. 3 is also a schematic showing, without an enclosing envelope, of a portion of an electron gun whereon suitably suggested, although not in any way limiting, dimensions for spacing and sizes of electrode elements for a cathode ray tube gun structure are suggested;

Fig. 4 is a diagrammatic representation of an equi-potential line plot of a portion of an electron gun structure of the form schematically shown by Figs. 1 through 3; and Fig. 5 is a schematic showing of the electron gun structure of Figs. 1 through 3 positioned within a cathode ray tube.

Referring now to the drawing for a further understanding of the nature of this invention, the tube electron gun is composed of a first anode 11 and a second anode 13 formed as substantially cylindrical members (it should here be noted that the drawing for clearness does not show the bounding lines of any of the electrode elements). These anode members, together with the cathode and its heater, if used, and grid electrodes, are positioned within the neck portion of the envelope housing the complete electrode system. The second anode 13 may, where desired, be formed as a conducting coating on the inner surface wall of the cylindrical neck of the enclosing envelope. Within the first anode element 11 suitable diaphragm elements, to be hereinafter described, are positioned in order to limit the size of the electron beam passing through to the second anode.

For the purpose of developing the electrons to form the electron beam, a convex cathode 15 is positioned at one end of the neck of the enclosing envelope. Surrounding the cathode 15 is a hollow cylindrical cathode shield 17 having a flat closed upper surface 19 except for the apertured portion 21 which is for the purpose of permitting the electrons emitted from the cathode to pass through the tube longitudinally under the application of a suitable voltage applied between the anode electrodes and the cathode.

In order to control the intensity of the developed electron beam, a control grid 23 in the form of a disc, or the equivalent, which is apertured at 25 is positioned closely adjacent the cathode shield structure. The cathode shield 17 is normally operated at cathode potential. Toward or in the end of the first anode element 11 adjacent to the control grid 23 is a diaphragm member 27 also suitably apertured to limit, as desired, the beam cross-sectional area. The relative size of this aperture with respect to other electrodes of the tube will be hereinafter more particularly described in connection with description of Fig. 4. There is also preferably provided a second apertured diaphragm 29 for the first anode member, this latter diaphragm member being positioned and supported within the circular portion of the anode at a point intermediate the ends of the tubular first anode member. The electrons released from the heated cathode and formed into the beam by the application of suitable voltages between the first anode and the cathode are passed in the direction of the arrow on Figs. 1 to 3 so as to impinge upon the luminescent screen 32 of the type shown, for example, by Fig. 5. The ratio of the electron accelerating and focussing voltages applied to the first and second anode elements relative to cathode may be within the range of 4 to 1 and 4.6 to 1, as explained, for example, in Chevallier patents No. 2,021,252 and No. 2,021,253 although in a tube of the type herein disclosed, these ratios of first and second anode voltages may be subject to some degree of variation.

The electrode arrangement shown by Fig. 1, it will be seen, discloses a type of non-overlapping virtual cathode structure 15, and it should be noted that the emitted electrons are formed into a diverging beam rather than to be emitted in a normal direction. The divergence is then over-rectified by the electro-static field extending within the aperture of the cathode shield. The electron beam developed is then acted upon by a positive control grid or control electrode element 23, it being understood that the control grid 23 operates at a voltage positive with respect to the cathode 15. The aperture 25 of the control grid 23 should preferably be a diameter which is at least equal to, but preferably greater than the aperture 21 in the cathode shield 17 so that the developed electron beam will not be limited in cross-section by the control grid but rather, any limitations in the cross-section of the beam will be due to the limiting effect produced by the aperture size of the apertured diaphragm member 29 in the first anode 11.

The form of the invention which has been shown by Fig. 2 is, in general similar, to that shown by Fig. 1 except that there is shown by Fig. 2 an overlapping cathode shield 17 which gives a conical effect to the surrounding electrostatic field, and thus reduces spherical aberration to a minimum. Otherwise, the structure shown in Fig. 2 is similar to that shown by Fig. 1, and the method and manner of operating the gun structure of Fig. 2 is also similar to that of Fig. 1, it being understood also in connection with Fig. 2 that the control grid 23 likewise is operated at a potential positive with respect to the cathode 11.

Referring now to the arrangement of Fig. 3, there is shown a slightly modified form of the general electrode arrangement of Figs. 1 and 2. In this modified form of the invention in which a screen grid electrode is positioned intermediate the first anode 11 and the control grid 23, this screen grid electrode 31 also has a diaphragm member 33 in which there is an aperture 35 of predetermined size. The cathode construction shown by Fig. 3 is of a slightly modified form from that shown by Figs. 1 and 2, and in this instance, the electrons are emitted from an emitting member 36 heated by a heater 38 in contrast to the directly heated cathode 15 shown by Figs. 1 and 2, although it is to be understood that the substitution of the type cathode shown by Fig. 3 may be readily made with respect to the electrode structure shown by Figs. 1 and 2. The dimensions suggested for the various elements forming the complete electron gun of Fig. 3 are merely suggested by way of example and are not critical although the dimensions shown have been indicated as being suitable for carrying out the aims and objects of this invention.

In operating a tube of the type herein described wherein the electrode arrangement is of the character shown by any of Figs. 1 through 3 inclusive, the general form of equi-potential plot of the electron gun is shown by Fig. 4 where the equi-potential lines are shown as solid lines of predetermined curvature extending transverse to the electrode members shown in enlarged section. The electron beam as it is developed is shown by the dot-dash lines of Fig. 4, and the voltages indicated are illustrated merely by way of example. The field plot for the complete gun structure is unnecessary to a full and complete understanding of this invention and, therefore, only that portion of the equi-potential line plot between the first anode and the electron emitting cathode has been indicated. However, the equipotential plot for the portion to the right of the first anode will be similar to that shown in Fig. 4.

The diagram of Fig. 4, however, it is believed shows clearly that there is developed at the cathode 15 a slightly divergent electron beam and that there is produced between the cathode 15 and the control grid 23 electrode a converging field which counterbalances the diverging field close to the cathode in order to give satisfactory control action. Further, Fig. 4 makes it apparent that the control grid 23 with an aperture diameter of the size shown by way of example and with a spacing between the anode and cathode shield of the order shown, will provide sufficient control action and yet only a very small percentage of the total beam current will be intercepted. Still further, the use of an apertured single disc control grid electrode operated at positive potential relative to the cathode reduces to a minimum the change in the focussing field between the control grid and the first anode with applied control grid voltage.

Referring further to Fig. 4, the various dimensions and spacings, while not entirely critical, may be given by the following relationships (referring to the letter designations on Fig. 4):

A is equal to or greater than B.
B is equal to or greater than C,
D is equal to or less than C,
E is approximately equal to C.
F is substantially the same order of magnitude as E, and
R is less than infinity.

Fig. 5 shows conventionally the completely assembled tube, and the numerical designations of Fig. 5 are shown in accordance with the designations used in connection with the other figures.

Referring to Fig. 5 further, it will be observed that no electron beam deflecting means has been illustrated, but, obviously, and as known in the art, for the purpose of deflecting the developed electron beam in order to sweep it across the structure of the luminescent screen 32, either electrostatic deflecting electrode plate arranged to deflect the developed beam in two mutually perpendicular directions or electromagnetic means used for the same purpose may be provided, or still, where desired, a combination of electrostatic and electromagnetic deflection means may be utilized, although these beam deflecting electrode systems do not, per se, form a part of the present invention.

Although there has been described and shown only three specific embodiments of the invention described, it is of course readily apparent that many modifications of the structural details are possible. The invention therefore is not to be restricted in its scope except in so far as is necessitated by the prior art and the spirit of the hereinafter appended claims.

Having now described the invention, what is claimed and desired to secure by Letters Patent is the following:

1. Cathode ray tube comprising a cathode having a convex outer surface formed as a surface of revolution, a tubular anode having included as a part thereof a series of apertured diaphragm members spaced a predetermined distance from the cathode, an apertured control electrode positioned intermediate the cathode and the tubular anode, frusto-conical shield electrode positioned intermediate the control electrode and the cathode and having its apex toward the cathode whereby a reversal of the radius of curvature of the equi-potential lines between the shield and control electrode may result when different potentials are applied to the shield and control electrode, and an envelope enclosing all of said electrode elements, said envelope having supported on one inner surface thereof a luminescent screen material to be subjected to bombardment by the produced electron beam.

2. An electron tube system comprising an envelope having included therein an anode, a control electrode and a cathode formed as a surface of revolution, said cathode having its outer surface convexly curved relative to the anode, means for applying between the anode and cathode a predetermined voltage difference to cause an electron beam to be developed, a luminescent screen supported so as to become responsive to the impact of the developed electron beam, said control electrode being positioned intermediate the cathode and the anode, a frusto-conical shield electrode positioned intermediate the control electrode and the cathode and having its apex toward the cathode whereby a reversal of the radius of curvature of the equi-potential lines between the shield and control electrode may result when different potentials are applied to the shield and the control electrode to produce substantially parallel electron beam paths in the region of the control electrode, and means for biasing the control electrode to a positive potential relative to the cathode.

3. An electron tube comprising an envelope wherein is supported electron gun structure comprising an anode, a cathode formed as a surface of revolution, said cathode having an outer surface curved convexly in the direction of said anode and a control electrode positioned intermediate the cathode and anode and adapted to be biased positively relative to the cathode, a plurality of diaphragm elements positioned within the anode for limiting the cross-sectional area of an electron beam developed between the cathode and anode upon the application of suitable voltages therebetween, a frusto-conical shield electrode positioned intermediate the control electrode and the cathode and having its apex toward the cathode whereby a reversal of the radius of curvature of the equi-potential lines between the shield and the control electrode may result, said shield and cathode electrodes being adapted to have voltages applied thereto in such manner as to provide a substantially parallel electron beam path in the region of the control electrode, and a luminescent screen positioned to receive the developed electron beam.

4. An electron tube comprising an envelope having an electron emitting cathode supported therein, an accelerating anode supported in axial alignment with the cathode, a control electrode supported in axial alignment with the cathode and anode and intermediate thereof, a frusto-conical shield electrode having its apex turned toward said cathode and located intermediate the cathode and control electrode, said frusto-conical shield electrode having its lateral edge substantially normal to the surface of said cathode whereby a reversal of the radius of curvature of the equi-potential lines between the shield and the control electrode may result when different potentials are applied to the shield and the control electrode.

5. An electron gun structure for cathode ray tubes comprising a cathode, a tubular anode positioned in axial alignment with the cathode said anode having at least one apertured diaphragm member supported therein with the aperture located substantially centrally of the diaphragm, an apertured control electrode having the apertured portion axially aligned with the aperture of the anode diaphragm and located intermediate the anode and cathode, and a frusto-conical shield electrode located intermediate the control electrode and the cathode and having its apex toward the cathode, said frusto-conical shield member having its lateral edge substantially normal to the surface of the cathode and the opening in the frusto-conical portion substantially axially aligned with the apertures of the control electrode and the anode whereby a reversal of the radius of curvature of the equi-potential lines between the shield and the control electrode may result when different potentials are applied to the shield and control electrode to produce substantially parallel electron beam paths in the region of the control electrode.

LEWIS BARNARD HEADRICK.